United States Patent [19]

Magori

[11] Patent Number: 4,949,321

[45] Date of Patent: Aug. 14, 1990

[54] ULTRASOUND ECHO PROFILE SENSOR USED AS TACTILE SENSOR

[75] Inventor: Valentin Magori, Munich, Fed. Rep. of Germany

[73] Assignee: Siemens Aktiengesellschaft, Berlin and Munich, Fed. Rep. of Germany

[21] Appl. No.: 102,725

[22] Filed: Sep. 30, 1987

[30] Foreign Application Priority Data

Sep. 30, 1986 [DE] Fed. Rep. of Germany ....... 3633268

[51] Int. Cl.[5] .............................................. G01S 15/08
[52] U.S. Cl. ...................................... 367/99; 367/902; 901/33
[58] Field of Search ............................ 367/99, 902, 96; 901/46, 33-35; 414/5; 73/862.04, DIG. 4

[56] References Cited

U.S. PATENT DOCUMENTS

| 4,161,885 | 7/1979 | Sack et al. ...................... 367/902 X |
| 4,327,427 | 4/1982 | Hotta et al. ......................... 367/96 X |
| 4,543,649 | 9/1985 | Head et al. ...................... 367/902 X |
| 4,634,947 | 1/1987 | Magori .............................. 367/96 X |
| 4,704,909 | 11/1987 | Grahn et al. ................. 73/DIG. 4 X |

FOREIGN PATENT DOCUMENTS 2358207 6/1975 Fed. Rep. of Germany ........ 367/99
0222542 5/1985 Fed. Rep. of Germany ... 73/862.04

*Primary Examiner*—Stephen C. Buczinski
*Assistant Examiner*—Tod Swann
*Attorney, Agent, or Firm*—Hill, Van Santen, Steadman & Simpson

[57] ABSTRACT

An ultrasound echo profile sensor for use as a tactile sensor, having an ultrasound measuring head containing a transmitter and a receiver and also having an entrained reference reflector by means of which the current speed of sound of the ambient air can be identified. The respective distance of the tactile sensor from a sensor subject can be correctly measured independently of the variable speed of sound of the ambient air because a reference echo caused by the reference reflector can be discriminated from situation echoes on the basis of its known, proximate position. The reference reflector, whose distance from the ultrasound receiver is constant in the reference case, is arranged such that the distance between the ultrasound receiver and the reference reflector changes in a characteristic way given tactile contact between a sensor head and the sensor subject, particularly a workpiece.

8 Claims, 3 Drawing Sheets 4,949,321

ULTRASOUND ECHO PROFILE SENSOR USED AS TACTILE SENSOR

BACKGROUND OF THE INVENTION

The present invention is directed to an ultrasound echo profile sensor for employment as a tactile sensor, which has an ultrasound measuring head containing a transmitter and a receiver which encompasses an entrained reference reflector by means of which the current speed of sound of the ambient air can be identified. The respective distance of a tactile sensor from a sensor subject can be correctly measured independently of the variable speed of sound in the ambient air because a reference echo caused by the reference reflector can be distinguished from situation echos on the basis of its known, approximate position.

The ultrasound echo profile evaluation provides an evaluation of complicated ultrasound reception signals. A reference reflector entrained with the ultrasound measuring head supplies a reference echo from a known distance, from which information the current speed of sound of the air can be identified. The respective distances can be correctly measured independently of the variable speed of sound of the air. The reference echo is distinguished from the echos of the situation on the basis of its known, approximate position or with the assistance of other known methods.

SUMMARY OF THE INVENTION

An object of the present invention is to provide an ultrasound echo profile sensor as a tactile sensor wherein a reference reflector whose distance from an ultrasound receiver is constant in a standard case, is arranged such that the distance between the ultrasound receiver and the reference reflector changes in a characteristic fashion given tactile contact between a sensor head and a sensor subject, particularly a workpiece.

The present invention is based on the concept of arranging the reference reflector R or some other reflector whose distance from the ultrasound pick-up or receiver E is normally constant, namely arranging it such that the distance between ultrasound pick-up and reflector varies in a characteristic way given tactile contact between a sensor head K, for example a gripper or a tool, and the sensor subject O, for example, a workpiece. When this change in distance ensues opposite a location-dependent force, for example a spring power, then the arrangement acts as a force sensor. Forces which do not act in the direction of sound can thereby also be acquired with suitable deflections.

BRIEF DESCRIPTION OF THE DRAWINGS

The features of the present invention which are believed to be novel, are set forth with particularly in the appended claims. The invention, together with further objects and advantages, may best be understood by reference to the following description taken in conjunction with the accompanying drawings, in the several FIGURES in which like reference numerals identify like elements, and in which:

DESCRIPTION OF THE PREFERRED EMBODIMENT

Figures 1A, 1B:
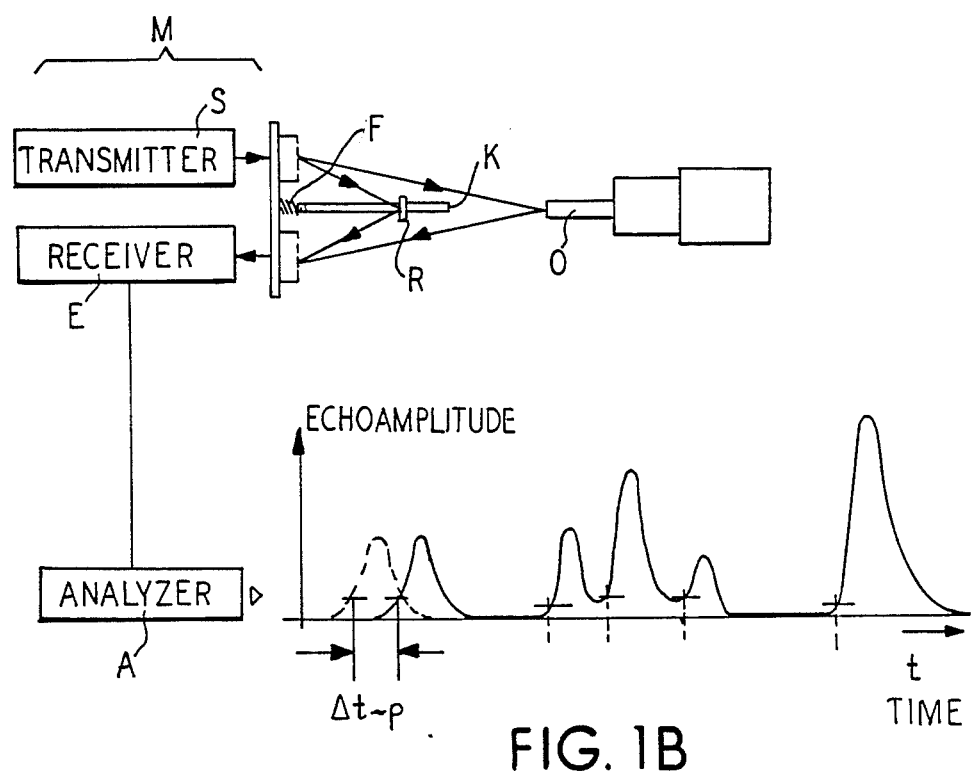
FIG. 1A is a schematic drawing of an ultrasound echo profile sensor used as a tactile sensor and constructed according to the present invention.
FIG. 1B is a graph of echo amplitude versuses time for the FIG. 1A device.

The present invention has general applicability, but is most advantageously utilized in a device as shown generally in FIG. 1. An ultrasound measuring head M has a transmitter or sender S and receiver E. Ultrasound waves are reflected by the reference reflector R to produce a reference echo.

Figure 2A:
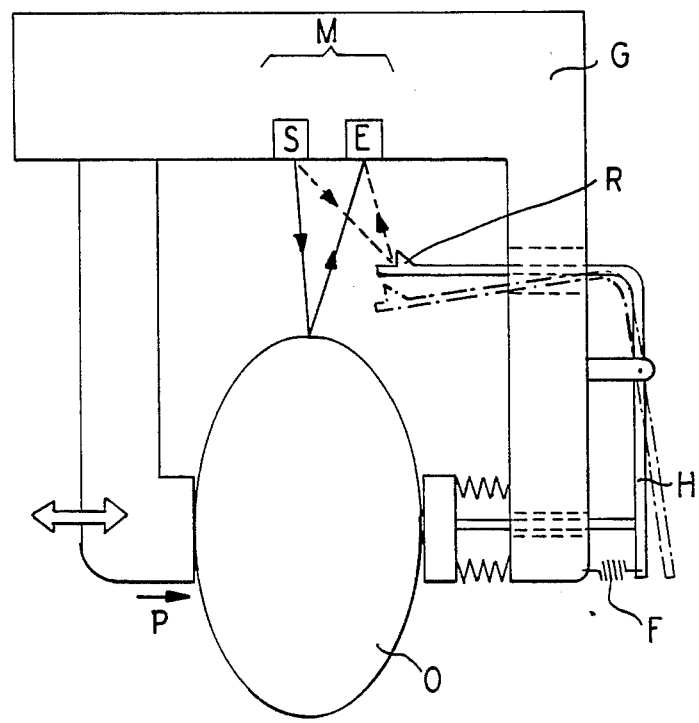
FIG. 2A is a schematic drawing of the present invention used with a robot hand.

A moveable sensor head K is connected to the reference reflector R for tactile contacting a sensor subject O. The sensor subject O also reflects ultrasound waves from the transmitter S to the receiver E to produce a situation echo. The reference echo and situation echo are compared by analyzer A, the results of which are depicted in the graph of FIG. 2A, showing the echo amplitude versuses time, $\Delta\tau$ indicating a change in time, and P representing the position of the sensor head K relative to the sensor subject O. A means F for providing a force, such as a spring is provided, as shown in FIG. 1.

As a further example, FIG. 2 shows a gripping force sensor for a robot hand or a gripper G. It is important to note that the distance to the sensor subject O or workpiece to be grabbed (an egg in the illustrated example) is simultaneously comeasured. When the space between the grab jaws is empty, the gripping force is zero and, accordingly, the gripping force sensor is in the position serving as a reference.

Figure 3B:
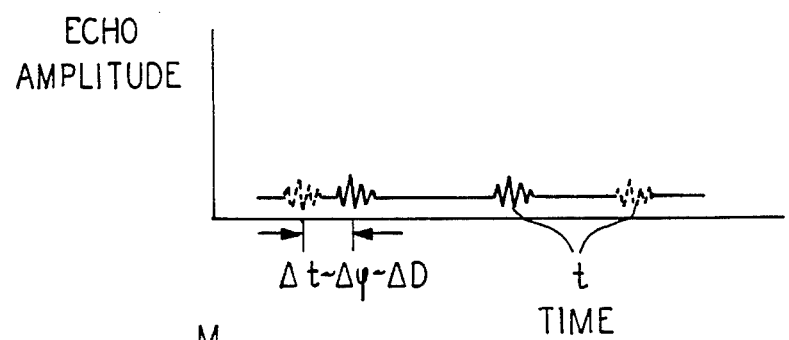
FIG. 3B is a graph of echo amplitude versuses time for the FIG. 3A device.
Figure 3A:
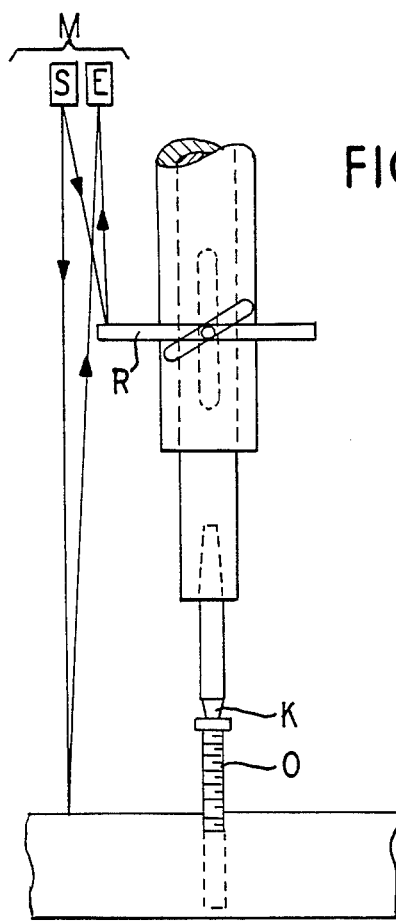
FIG. 3A is a schematic drawing of the present invention used with a torque generator.

The echo profile evaluation also enables a rotational angle or, respectively, torque measurement with deflections which convert rotational angle or, respectively, torques into inventively evaluatable distance changes of an ultrasound reflector. As an example of this, FIG. 3 shows a schematic illustration of a non-contacting torque generator for the spindle of a drilling machine which is used as a screwdriver in the illustrated example, whereby the tool is simultaneously seized.

As shown in the examples set forth, an important secondary aspect of the invention is that an ultrasound sensor already utilized for other purposes can be utilized for additional measuring tasks without great outlay. Inversely, a tactile sensor utilized according to the present invention can also perform additional recognition and positioning functions.

Figure 2B:
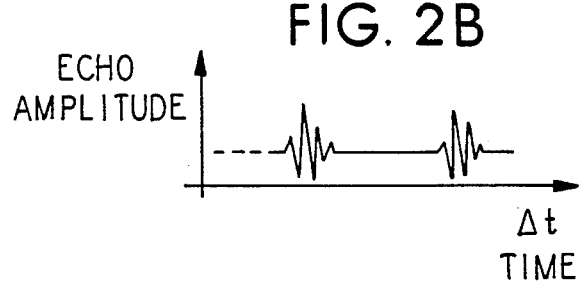
FIG. 2B is a graph of echo amplitude versuses time for the FIG. 2A device.

Of course, the invention also includes ultrasound difference sensors which are exclusively utilized in the described fashion as path, force, rotational angle or torque pick-ups. FIGS. 2B and 3B depict the graph of echo amplitude versuses time for the devices shown in FIGS. 2 and 3, respectively.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. An ultrasound echo profile sensor for use as a tactile sensor, having an ultrasound measuring head containing a transmitter and a receiver and further having an entrained reference reflector by means of which momentary speed of sound of ambient air can be determined, whereby the respective distance of the tactile sensor from a sensor subject is to be correctly measured independently of the variable speed of sound of the ambient air because a reference echo caused by the reference reflector can be discriminated from situation echoes due to its known, approximate position, said reference reflector, whose distance from the ultrasound receiver is constant in a reference case in which there is no contact between the measuring head and the sensor subject, is arranged such that the distance between the ultrasound receiver and the reference reflector changes in a predetermined fashion relative to tactile contact between a sensor head and the sensor subject.

2. The ultrasound echo profile sensor according to claim 1 wherein an application as a force sensor is provided when the distance change ensues relative to a positionally dependent force.

3. The ultrasound echo profile sensor according to claim 2 wherein a device for deflecting forces which do not act in the direction of sound is provided.

4. The ultrasound echo profile sensor according to claim 2 wherein an application of the force sensor as gripping force sensor is provided, wherein a relative deflection of a lever with respect to the ultrasound measuring head which is arranged in a gripper and is aligned to the sensor subject in terms of sound is a function of the gripping force and whereby the distance from the sensor subject to be grasped is simultaneously co-acquired.

5. An ultrasound echo profile sensor for use as a tactile sensor comprising:

an ultrasound measuring head having a transmitter and a receiver for producing and receiving, respectively, ultrasound waves;

at least one reference reflector for reflecting said ultrasound waves from said transmitter to said receiver to produce a reference echo;

a moveable sensor head connected to said reference reflector for tactile contacting a sensor subject, said sensor subject also reflecting ultrasound waves from said transmitter to said receiver to produce a situation echo;

means for providing a force to said sensor head for tactile contacting said sensor subject; and said reference reflector having a known predetermined reference distance from said measuring head to determine momentary speed of sound of ambient air when there is no contact between the measuring head and the sensor subject, a distance between said receiver and said reference reflector changing in a predetermined fashion relative to tactile contact between said sensor head and said sensor subject, and wherein the respective distance of said sensor head from said sensor subject is correctly measured independently of the variable speed of sound in the ambient air because the reference echo can be discriminated from the situation echo due to the known position of said reference reflector.

6. The ultrasound echo profile sensor according to claim 5 wherein said means for providing a force is a mechanism for producing a positioned dependent force such that said ultrasound echo profile sensor operates as a force sensor.

7. The ultrasound echo profile sensor according to claim 6 wherein said ultrasound echo profile sensor further comprises a device for deflecting forces which do not act in the direction of the ultrasound waves.

8. The ultrasound echo profile sensor according to claim 6 wherein said ultrasound echo profile sensor further comprises a lever carrying said reference reflector and connected to a gripper carrying said sensor head and aligned to said sensor subject to be gripped by said gripper, a relative deflection of said lever being a function of gripping force of said gripper, whereby the distance from the sensor subject from said sensor head is determined.

* * * * *